XR 3,719,939

[11] 3,719,939
Geil et al.
[45] March 6, 1973

[54] DIFFERENTIAL PRESSURE TRANSDUCER

[75] Inventors: Fred G. Geil, Pittsburgh; William K. Dunsworth, Export, both of Pa.

[73] Assignee: Westinghouse Electric Corporation, Pittsburgh, Pa.

[22] Filed: Feb. 9, 1971

[21] Appl. No.: 113,999

[52] U.S. Cl............340/261, 200/83 Y, 340/258 R
[51] Int. Cl..............................................G08b 13/10
[58] Field of Search...340/261, 17, 258 R; 200/86 A, 200/83 Y; 310/88

[56] References Cited

UNITED STATES PATENTS

| | | | |
|---|---|---|---|
| 3,438,021 | 4/1969 | Nelkin et al. | 340/261 |
| 3,489,997 | 1/1970 | Morris | 340/17 |

Primary Examiner—John W. Caldwell
Assistant Examiner—Glen R. Swann, III
Attorney—F. H. Henson, C. F. Renz and M. P. Lynch

[57] ABSTRACT

The invention relates to a differential pressure transducer employing two spaced apart flexible diaphragm elements, a deflection responsive electrical transducer, such as a piezoelectric crystal, operatively connected to at least one of the diaphragm elements, and a rigid spacer extending between the adjacent surfaces of the diaphragm elements to assure uniform displacement of the diaphragms in response to differential pressures applied to the remote surfaces of the diaphragm elements. Furthermore the rigid spacer prevents deformations of the diaphragm elements resulting from an increase in static pressure conditions existing at the remote surfaces of the diaphragm elements thereby providing inherent zero balance of the differential pressure transducer.

8 Claims, 4 Drawing Figures

PATENTED MAR 6 1973 3,719,939

WITNESSES
Theodore M. Nickel
James F. Young

INVENTORS
Fred G. Geil and
William K. Dunsworth
BY Michael P. Lynch
ATTORNEY

DIFFERENTIAL PRESSURE TRANSDUCER

BACKGROUND OF THE INVENTION

A pressure sensitive security apparatus is disclosed and claimed in U.S. Pat. No. 3,438,021 issued Apr. 3, 1969 and assigned to the assignee of the present invention. A pair of fluid filled tubes positioned in a spaced apart relationship, typically of the order of 2 to 5 feet are utilized to render the security apparatus insensitive to remote sounds or disturbances while retaining sensitivity to local sounds and disturbances. Individual transducers means are operatively connected to each of the two fluid filled tubes.

The theory of operation of the two tube system is that a remote disturbance or change of atmospheric conditions will effect each tube similarly and that by providing an electrical null circuit at the output of the transducer means, equal applied pressure to the two tubes will result in a net zero electrical output signal. In the event of a local disturbance, which results in unequal applied pressure to the two tubes, the balance circuit will develop an electrical signal which is a function of the difference in the pressures applied to the tubes. This signal is available for intruder detection alarm.

A transducer system disclosed in the above-identified U.S. Patent discloses the use of two separate pressure transducers, the outputs of which are electrically combined in a bucking relationship. Each transducer comprises a diaphragm element and a deflection sensitive crystal transducer element operatively associated with each diaphragm element. The electrical response of each transducer is combined so that equal electrical signals corresponding to equal applied pressures tend to cancel each other.

An inherent shortcoming of this system is that exact electrical balance cannot be maintained between the respective transducer elements inasmuch as the elements of each detector exhibit peculiar sensitivity to mechanical stress, temperature variations and aging.

Furthermore each pressure transducer functions as a gauge type pressure transducer in which one surface of the diaphragm element is subjected to the static line pressure of the fluid filled tube and the opposite surface is subjected to an environment of ambient pressure. Under these conditions, high static line pressures tend to develop over a period of time causing a zero unbalance in the transducer.

Yet another problem encountered in the single diaphragm transducer is undesirable mechanical resonance of the individual diaphragm-crystal combinations at a frequency of approximately 15 Hertz which is produced by the massive fluid in the tube acting against the gauge type diaphragm-crystal combination.

SUMMARY OF THE INVENTION

An embodiment of a novel differential pressure transducer is disclosed below which comprises a combination of two diaphragm-crystal disc combinations to form essentially a bi-directional differential pressure transducer. The diaphragm-crystal disc combinations are sealed in a substantially parallel relationship with the crystal disc in a slight spaced-apart, adjacent relationship. A relatively rigid spacer is positioned between the crystals to contact the surfaces of the crystals to thereby effectively transmit mechanical deflection of one of the diaphragm-crystal disc combinations to the other to insure uniform, simultaneous deflection of both diaphragm-crystal combinations. The thickness of the diaphragm is maintained large relative to the thickness of the crystal disc to establish the neutral plane of the diaphragm-crystal disc combination within the diaphragm to assure optimum sensitivity of the crystal disc to deflections resulting from pressure changes. The neutral plane is defined to be the interface between compression stress and tension stress in the deflection diaphragm-crystal disc combination.

The crystal discs are approximately one inch in diameter and approximately 15 mils thick, whereas the diaphragms are approximately 2½ inches in diameter and 20 mils thick. The spacer extending between the approximate centers of the spaced apart crystals discs corresponds essentially to a metal rod about ⅛ inch in diameter and 30 mils thick.

The outer surface of one of the diaphragm-crystal discs combinations is subjected to the fluid pressure of one of the fluid-filled tubes while the outer surface of the other diaphragm-crystal disc combination is subjected to the fluid pressure of the other fluid-filled tube. Electrical leads are connected between the diaphragm-crystal disc combinations and a remote electrical monitoring circuit to transmit the net electrical signal resulting from pressure deflection of diaphragm-crystal disc combinations, which results in tension stress in one of the crystal discs and compression stress in the other crystal disc, to the electrical monitoring circuit as an indication of pressure differential between the two fluid filled tubes. The volume defined between the diaphragm-crystal disc combinations is filled with a compliant material such as air, or a silicon rubber. The use of a compliant material in this volume coupled with the use of the spacer, which contacts a minimum surface of the respective crystal discs, provides desirable transducer sensitivity to pressure changers. Furthermore the use of the spacer to provide a mechanical back-to-back interconnection between the two diaphragm-crystal disc combinations provides desired mechanical and electrical balance for the bi-directional differential pressure transducer. The resonant frequency problem encountered in the prior art single diaphragm-crystal disc pressure transducer is eliminated by the use of two diaphragms in that the latter arrangement increases the overall stiffness of the pressure transducer which in turn raises the resonant frequency to a value capable of being damped by the fluid-filled tubes.

Furthermore, the bi-directional arrangement of the diaphragm-crystal disc combinations minimizes the adverse effects of increases in the static line pressure of the fluid filled tubes by simultaneously exposing both diaphragm-crystal disc combinations to static line pressure changes thus preventing a net deflection and maintaining original sensitivity.

DESCRIPTION OF THE DRAWINGS

The invention will become more readily apparent from the following exemplary description in connection with the accompanying drawings.

DESCRIPTION OF THE PREFERRED EMBODIMENT

Figure 1:
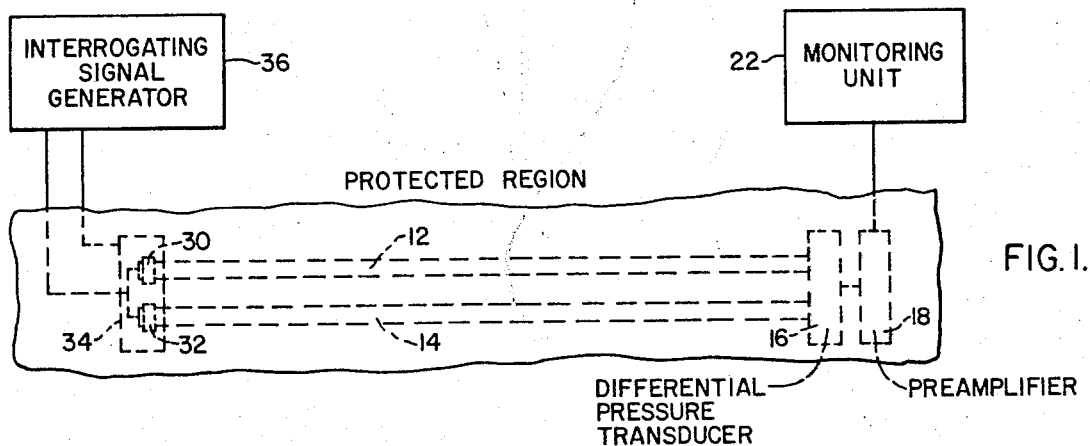
FIG. 1 is a diagrammatic view showing a preferred embodiment of the invention.

Referring to FIG. 1 there is illustrated diagrammatically a pressure sensitive security apparatus 10 concealed beneath the surface of the earth to provide intrusion detection. The security apparatus 10 comprises essentially a pair of fluid filled tubes 12 and 14 and a differential pressure sensitive device 16. The tubs 12 and 14 are composed of compliant materials such as rubber and each tube is filled with an incompressible gas or liquid.

In providing intrusion detection for a protected region a plurality of security apparatuses 10, each including a preamplifier 18, are disposed around the perimeter of the protected region. In the practice of this invention the monitoring unit 22 is connected to respond to the output of the preamplifier 18.

For purposes of checking the on-line operation of the differential pressure sensitive device 16 an interrogating signal from signal generator 36 is impressed on the interrogating transducers 30 and 32 located within a housing 34. The interrogating signal may be impressed simultaneously on the fluid filled tubes 12 and 14 to check the zero balance of the differential pressure sensitive device, or may be impressed alternately on tubes 12 and 14 to check the positive and negative deflection calibrations of the pressure sensitive device 16. The description and operation of an interrogating transducer is presented in the referenced U.S. Patent.

Figure 2:
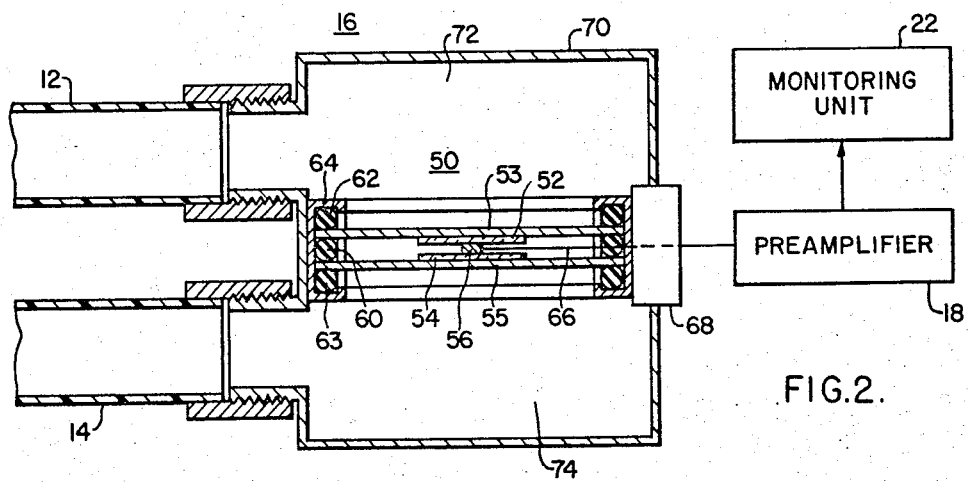
FIG. 2 is a view in section showing the connection of the fluid filled tubes of FIG. 1 to the bi-directional differential pressure transducer means.

The differential pressure sensitive device 16 is illustrated sectionally in FIG. 2 as comprising a pressure transducer 50 which is sealed within a housing 70.

The pressure transducer comprises piezoelectric ceramic crystal discs 52 and 54 secured centrally to pressure responsive diaphragms 53 and 55, respectively, and a relatively rigid spacer 56 positioned between the crystal discs 52 and 54 in abutting contact with the central portion of the adjacent surfaces of the crystal discs. The O-ring seal 60 maintains the peripheral spacing of the pressure diaphragms 53 and 55, which are typically stainless steel discs, while O-ring seals 62 and 63, which are positioned in sealing adapter 64, provide fluid tight sealing of the pressure transducer 50 within housing 70 thereby dividing housing 70 into two fluid chambers 72 and 74. The chamber 72 is occupied by fluid from tube 12, and chamber 14 is occupied by fluid from tube 14. Electrical lead wires 66 extend from the crystal discs 52 and 54 through O-ring 60 and an electrical interconnect 68 to the preamplifier 18. The crystal discs 52 and 54 are connected electrically in parallel and transmit a net electrical signal of one polarity to the amplifier 18 in response to deflection of the transducer in one direction and an electrical signal of the opposite polarity in response to deflection of the transducer 50 in the opposite direction.

A positive, direct mechanical connection provided between the diaphragm-crystal disc combination by the metal spacer 56 assures identical deflection of both diaphragm-crystal disc combinations in response to changes in differential pressure in the fluid filled lines thus establishing a continuous electrical balance of the crystal discs 52 and 54 of the transducer 50.

The rigid spacer 56 may be mechanically secured to the crystal discs or, for ease of fabrication of the transducer 50, the thickness of the rigid spacer 56 may be made greater than the spacing between the adjacent surfaces of the crystal discs 52 and 54 such that the insertion of the rigid spacer 56 between the adjacent surfaces of the crystal discs will cause the diaphragm members 53 and 55 to be deformed slightly outward so as to act in compression on the rigid spacer 56 to retain it in position between the crystal discs.

The use of a compliant filler material, such as air or silicon rubber, in the volume 76 defined within the transducer 50 by the sealed diaphragms 53 and 55 coupled with the use of a rigid spacer of relatively small diameter provides desirable pressure transducer sensitivity. The use of the dual diaphragm elements 53 and 55, as contrasted to the conventional single diaphragm pressure transducer identified in the above referenced U.S. Patent, increases the stiffness of the transducer 50 sufficiently to raise the resonant frequency of the transducer 50 to a value above 15 Hertz which may be easily damped by the hoses 12 and 14, thereby eliminating the mechanical resonance problems encountered by the single diaphragm transducer.

Furthermore, the bi-directional design of the pressure transducer 50, in which fluid pressure is applied to both sides significantly reduces the transducer deformations encountered by the conventional gauge type transducers when subjected to changes in static line pressure and substantially eliminates the electrical unbalance resulting therefrom.

Figure 3:
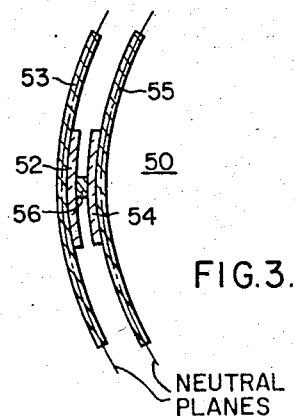
FIG. 3 shows the reaction of the diaphragm-crystal disc combinations of the transducers of FIG. 2 to changes in fluid pressure in the fluid filled tubes of the embodiment of FIG. 1.

A mechanical deflection of the transducer 50 in response to unequal pressures in chambers 72 and 74 is illustrated in FIG. 3. In the fabrication of the transducer 50 it is important to maintain the diaphragm thickness sufficiently large with respect to the crystal discs to assure that the neutral planes of the respective diaphragm-crystal disc combinations exist in the diaphragm elements in order to assure optimum crystal disc electrical sensitivity, while at the same time preventing the thickness of the diaphragms from reaching a value which will cause the transducer to be excessively stiff thereby reducing pressure sensitivity.

Figure 4:
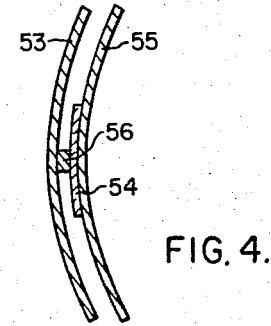
FIG. 4 is a sectional illustration of an alternate embodiment of the invention.

While the transducer 50 described thus far utilizes two crystal discs to provide operational symmetry as well as a duplication of transducer elements to provide a back-up in the event one of the crystal discs fails, this redundancy may be eliminated as illustrated in FIG. 4. In this embodiment the rigid spacer extends between a single crystal discs and the surface of a diaphragm. The electrical manifestation of a change in fluid differential pressure is generated by the single crystal disc.

In either embodiment it is apparent that the rigid spacer 56 could function as an electrical contact with the crystal discs if the spacer is fabricated from a suitable electrical conductive material, in which case an electrical lead would be connected to the spacer.

We claim:

1. A differential pressure assembly for generating an electrical signal indicative of difference in fluid pressure comprising, a pressure responsive assembly means including first and second flexible diaphragm elements positioned in a spaced apart relationship defining an internal volume between adjacent internal surfaces of said first and second diaphragm elements, a deflection responsive piezoelectric crystal transducer means mounted on the internal surface of said first flexible diaphragm element, the thickness of said first flexible diaphragm element being sufficiently large with respect to the thickness of piezoelectric crystal transducer means so as to establish the neutral plane of the combination formed by said first flexible diaphragm and said piezoelectric crystal transducer means in said first flexible diaphragm element, and coupling means inserted within said internal volume to provide mechanical coupling between said first and second diaphragm elements, said coupling means providing like deflection of said first and second flexible diaphragm elements in the amount of deflection and direction of deflection in response to a net difference in fluid pressure present at the external surfaces of said first and second diaphragm elements, said deflection responsive piezoelectric transducer means producing a measurable electrical signal indicative of the difference in fluid pressure.

2. A differential pressure transducer as claimed in claim 1 wherein said coupling means is a compliant material which substantially fills said internal volume.

3. A differential pressure transducer as claimed in claim 1 wherein said coupling means is a relatively rigid spacer positioned between the approximate centers of said first and second flexible diaphragm elements and contacting the internal surfaces of said first and second flexible diaphragm elements.

4. A differential pressure transducer as claimed in claim 3 wherein the combination of said first and second flexible diaphragm elements and said relatively rigid spacer element establishes differential pressure transducer resonant frequency which is greater than 15 hertz.

5. A differential pressure transducer assembly as claimed in claim 3 wherein the ratio of the cross sectional area of said piezoelectric crystal disc to the cross sectional area of said relatively rigid spacer is greater than 10:1.

6. A differential pressure transducer as claimed in claim 1 including a second piezoelectric crystal disc mounted on the internal surface of said second flexible diaphragm element said, an electrical lead means for interconnecting the first and second piezoelectric crystal discs, and electrical circuit means operatively connected to said electrical leads to monitor said electrical signal produced by said electrically interconnected piezoelectric crystal discs as indication of pressure between fluid contacting the external surface of said first flexible diaphragm element and fluid contacting the external surface of said second flexible diaphragm element.

7. A differential pressure transducer assembly as claimed in claim 1 wherein both faces of the piezoelectric crystal disc are in tension during deflection of said first flexible diaphragm element in one direction, and both faces of said piezoelectric crystal disc are in compression in response to deflection of said first flexible diaphragm element in the opposite direction.

8. A differential pressure transducer assembly as claimed in claim 6 wherein both faces of said first piezoelectric crystal disc are in tension and both faces of said second piezoelectric crystal disc are in compression in response to deflection of said first and second diaphragm elements in a first direction, and both faces of said first piezoelectric crystal disc are in compression and both faces of said second piezoelectric crystal disc are in tension in response to deflection of said first and second flexible diaphragm elements in the opposite direction.

* * * * *